United States Patent
Saleh et al.

(10) Patent No.: US 7,428,212 B2
(45) Date of Patent: *Sep. 23, 2008

(54) BEST EFFORT TECHNIQUE FOR VIRTUAL PATH RESTORATION

(75) Inventors: Ali Najib Saleh, Ft. Lauderdale, FL (US); H. Michael Zadikian, Santa Monica, CA (US); Zareh Baghdasarian, La Canada, CA (US); Vahid Parsi, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 936 days.

This patent is subject to a terminal disclaimer.

(21) Appl. No.: 10/151,678

(22) Filed: May 20, 2002

(65) Prior Publication Data

US 2003/0031127 A1  Feb. 13, 2003

Related U.S. Application Data

(63) Continuation-in-part of application No. 09/891,022, filed on Jun. 25, 2001, which is a continuation-in-part of application No. 09/858,743, filed on May 16, 2001, now Pat. No. 7,352,692, which is a continuation-in-part of application No. 09/232,397, filed on Jan. 15, 1999, now Pat. No. 6,856,627.

(51) Int. Cl.
*H04L 12/26* (2006.01)
(52) U.S. Cl. .................................. 370/228; 370/244
(58) Field of Classification Search ............... 370/228, 370/237, 236.2, 242, 244, 216–218
See application file for complete search history.

(56) References Cited

U.S. PATENT DOCUMENTS

| | | | |
|---|---|---|---|
| 5,049,871 A | 9/1991 | Sturgis et al. | 370/224 |
| 5,093,824 A | 3/1992 | Coan et al. | 370/16 |

(Continued)

FOREIGN PATENT DOCUMENTS

EP    0 781 068 A1    6/1997

(Continued)

OTHER PUBLICATIONS

Ali Saleh, H. Michael Zadikian, Zareh Baghdasarian, Vahid Parsi, "A Method For Routing Information Over A Network", filed Jan. 15, 1999, U.S. Appl. No. 09/232,397.

(Continued)

*Primary Examiner*—Wing F Chan
*Assistant Examiner*—Hong Sol Cho
(74) *Attorney, Agent, or Firm*—Campbell Stephenson LLP

(57) ABSTRACT

A method and apparatus for restoring a virtual path are disclosed. The method includes identifying an alternate physical path and determining whether the alternate physical path is able to support the virtual path by determining whether each node of the second subset of nodes has sufficient resources necessary to support the virtual path. The virtual path is over a physical path in an optical network, and the optical network includes a number of nodes. The physical path includes a first subset of nodes of the nodes. The alternate path includes a second subset of nodes of the nodes and is between a first node and a second node of the first subset of nodes.

58 Claims, 8 Drawing Sheets

U.S. PATENT DOCUMENTS

| | | | |
|---|---|---|---|
| 5,412,376 A | 5/1995 | Chujo et al. | 340/825.1 |
| 5,590,118 A | 12/1996 | Nederlof | 370/218 |
| 5,596,722 A | 1/1997 | Rahnema | 395/200 |
| 5,646,936 A | 7/1997 | Shah et al. | 370/228 |
| 5,649,108 A | 7/1997 | Spiegel et al. | 395/200.12 |
| 5,687,167 A | 11/1997 | Bertin et al. | 370/254 |
| 5,737,319 A | 4/1998 | Croslin et al. | 370/255 |
| 5,748,611 A | 5/1998 | Allen et al. | 370/224 |
| 5,781,528 A | 7/1998 | Sato et al. | 370/218 |
| 5,805,578 A | 9/1998 | Stirpe et al. | 370/255 |
| 5,805,593 A | 9/1998 | Busche | 370/396 |
| 5,835,696 A | 11/1998 | Hess | 395/182.08 |
| 5,881,048 A | 3/1999 | Croslin | 370/228 |
| 5,881,246 A | 3/1999 | Crawley et al. | 709/238 |
| 5,884,297 A | 3/1999 | Noven | 707/1 |
| 5,920,257 A | 7/1999 | Commerford | 340/506 |
| 5,933,422 A * | 8/1999 | Kusano et al. | 370/331 |
| 5,933,425 A | 8/1999 | Iwata | 370/351 |
| 5,959,972 A | 9/1999 | Hamami | 370/228 |
| 5,987,526 A | 11/1999 | Morales | 709/249 |
| 5,995,503 A | 11/1999 | Crawley et al. | 370/351 |
| 5,999,286 A | 12/1999 | Venkatesan | 359/117 |
| 6,011,780 A | 1/2000 | Vaman et al. | 370/237 |
| 6,041,037 A | 3/2000 | Nishio et al. | 370/228 |
| 6,041,049 A | 3/2000 | Brady | 370/351 |
| 6,047,331 A | 4/2000 | Medard et al. | 709/239 |
| 6,075,766 A | 6/2000 | Croslin | 370/225 |
| 6,075,775 A | 6/2000 | Ueki | 370/248 |
| 6,097,696 A | 8/2000 | Doverspike | 370/216 |
| 6,097,722 A | 8/2000 | Graham et al. | 370/395 |
| 6,115,753 A | 9/2000 | Joens | 709/242 |
| 6,130,876 A | 10/2000 | Chaudhuri | 370/228 |
| 6,130,881 A | 10/2000 | Stiller et al. | 370/238 |
| 6,134,671 A | 10/2000 | Commerford et al. | 714/4 |
| 6,148,000 A | 11/2000 | Feldman et al. | 370/397 |
| 6,154,778 A | 11/2000 | Koistinen et al. | 709/228 |
| 6,163,525 A | 12/2000 | Bentall et al. | 370/227 |
| 6,222,653 B1 | 4/2001 | Asahi | 359/110 |
| 6,229,787 B1 | 5/2001 | Byrne | 370/218 |
| 6,259,673 B1 | 7/2001 | Yoshihara et al. | 370/238 |
| 6,272,107 B1 | 8/2001 | Rochberger et al. | 370/216 |
| 6,275,492 B1 | 8/2001 | Zhang | 370/392 |
| 6,282,170 B1 | 8/2001 | Bentall et al. | 370/225 |
| 6,292,464 B1 | 9/2001 | Elahmadi et al. | 370/223 |
| 6,301,244 B1 | 10/2001 | Huang et al. | 370/351 |
| 6,304,549 B1 | 10/2001 | Srinivasan et al. | 370/230 |
| 6,324,162 B1 | 11/2001 | Chaudhuri | 370/225 |
| 6,347,078 B1 | 2/2002 | Narvaez-Guarnieri et al. | 370/230 |
| 6,370,119 B1 | 4/2002 | Basso et al. | 370/252 |
| 6,400,681 B1 | 6/2002 | Bertin et al. | 370/218 |
| 6,430,150 B1 | 8/2002 | Azuma et al. | 370/218 |
| 6,457,050 B1 | 9/2002 | Cowan et al. | 709/224 |
| 6,463,062 B1 | 10/2002 | Buyukkoc et al. | 370/395.1 |
| 6,493,317 B1 | 12/2002 | Ma | 370/237 |
| 6,504,845 B1 | 1/2003 | Petersen et al. | 370/412 |
| 2002/0191247 A1 | 12/2002 | Lu et al. | 359/124 |

FOREIGN PATENT DOCUMENTS

| | | |
|---|---|---|
| EP | 0 841 824 A2 | 5/1998 |

OTHER PUBLICATIONS

H. Michael Zadikian; Steven E. Plote, John C. Adler, David Parish Autry, Ali Saleh, "Method of Providing Network Services", filed Jan. 4, 2000; U.S. Appl. No. 09/477,498.

Ali Saleh, "A Method For Path Selection In A Network", filed Jan. 4, 2000; U.S. Appl. No. 09/478,235.

Ali N. Saleh and Stevan E. Plote, "A Network Addressing Scheme For Reducing Protocol Overhead In An Optical Network", filed Sep. 2, 1999; U.S. Appl. No. 09/389,302.

Ali Saleh, H. Michael Zadikian; John C. Adler, Zareh Baghdasarian, Vahid Parsi, "Configurable Network Router", filed Jan. 15, 1999; U.S. Appl. No. 09/232,395.

Ali N. Saleh, Douglas E. Duschatko, Lane Byron Quibodeaux, "Method And Apparatus For A Rearrangeably Non-Blocking Switching Matrix", filed Jan. 4, 2000; U.S. Appl. No. 09/477,166.

H. Michael Zadikian, Ali Saleh; John C. Adler, Zareh Baghdasarian, Vahid Parsi, "A Resource Management Protocol For A Configurable Network Router", filed Jan. 4, 2000; U.S. Appl. No. 60/174,323.

Ronald Alan Russell and Michael Kevin Anthony, "A Method And Apparatus For Isolating Faults In A Switching Matrix", filed Jan. 4, 2000; U.S. Appl. No. 09/477,217.

H. Michael Zadikian, Ali Saleh, John C. Adler, Zareh Baghdasarian, Vahid Parsi, "A Method of Allocating Bandwidth in an Optical Network" (as amended), filed Jan. 15, 1999, U.S. Appl. No. 09/232,396.

The ATM Forum Technical Committee, "Interim Inter-switch Signaling Protocol (IISP) Specification v1.0", af-pnni-0026.000, Dec. 1994, pp. 1-34.

The ATM Forum Technical Committee, Private Network-Network Interface Specification Version 1.0 (PNNI 1.0), afpnni-0055.000, Mar. 1996, pp. v-xviii, pp. 19, 1-366.

The ATM Forum Technical Committee, Private Network-Network Interface Specification Version 1.0 Addendum (Soft PVC MIB), af-pnni-0066.000, Sep. 1996.

The ATM Forum Technical Committee, Addendum to PNNI V1.0 for ABR parameter negotiation, af-pnni-0075.000, Jan. 1997.pp. 2-3.

The ATM Forum Technical Committee, PNNI V1.0 Errata and PICS, af-pnni-0081.000, May 1997, pp. 2-224.

J. Moy, "OSPF Version 2", Ascend Communications, Inc., Apr. 1998.

K. Murakami, et al., "A MAPOS version 1 Extension—Switch-Switch Protocol", NTT Laboratories, Jun. 1997.

F. Baker, et al., "OSPF Version 2 Managermernt Information Base", Cisco Systems, Nov. 1995.

F. Baker, et al., "PPP Bridging Control Protocol (BCP)", IBM, Jun. 1994.

E. Decker, "Definitions of Managed Objects for Bridges", Cisco Systems, Inc., Jul. 1993.

Hideki Sakauchi, et al., "A Self-Healing Network With An Economical Spare-Channel Assignment," Proceedings of the Globecom '90 IEEE Telecommunications Conference & Exhibition, vol. 1, 1991, pp. 438-443.

Baruch Awerbuch, et al., "Distributed Controls for PARIA," Proc. Annual ACM Symp. on Principles of Distributed Computing, Aug. 22, 1999, pp. 145-159.

Sujai Hajela, "HP OEMF: Alarm Management In Telecommunications Networks," *Hewlett Packard Journal*, Oct. 1996, vol. 47, No. 5, pp. 22-30.

* cited by examiner

BEST EFFORT TECHNIQUE FOR VIRTUAL PATH RESTORATION

CROSS-REFERENCES TO RELATED APPLICATIONS

This application is continuation-in-part of patent application Ser. No. 09/891,022, filed Jun. 25, 2001, currently pending, and entitled "A METHOD FOR RESTORING A VIRTUAL PATH IN AN OPTICAL NETWORK USING DYNAMIC UNICAST," having H. M. Zadikian, A. N. Saleh, Z. Baghdasarian, and V. Parsi as inventors (which is a continuation-in-part of patent application Ser. No. 09/858,743, filed May 16, 2001 and entitled "A RESOURCE RESERVATION SCHEME FOR PATH RESTORATION IN AN OPTICAL NETWORK," now U.S. Pat. No. 7,352,692, having the same inventors; which, in turn, is a continuation-in-part of patent application Ser. No. 09/232,397, filed Jan. 15, 1999, now U.S. Pat. No. 6,856,627, issued Feb. 15, 2005, and entitled "A METHOD FOR ROUTING INFORMATION OVER A NETWORK," having the same inventors), which are assigned to Cisco Technology, Inc., the assignee of the present invention, and are hereby incorporated by reference, in their entirety and for all purposes.

BACKGROUND OF THE INVENTION

1. Field of the Invention

This invention relates to the field of information networks, and more particularly relates to a protocol for configuring routes over a network.

2. Description of the Related Art

Today's networks carry vast amounts of information. High bandwidth applications supported by these networks include streaming video, streaming audio, and large aggregations of voice traffic. In the future, these bandwidth demands are certain to increase. To meet such demands, an increasingly popular alternative is the use of lightwave communications carried over fiber-optic cables. The use of lightwave communications provides several benefits, including high bandwidth, ease of installation, and capacity for future growth.

Optical infrastructures are capable of transmission speeds in the gigabit range, which helps address the ever-increasing need for bandwidth mentioned above. Such infrastructures employ various topologies, including ring and mesh topologies. In order to provide fault protection, ring topologies normally reserve a large portion (e.g. 50% or more) of the network's available bandwidth for use in restoring failed circuits.

Traditionally, the networks allocate bandwidth and resources for the transmission of data and assign certain priorities to data paths such as the Quality of Service and like. These priorities only guarantee that if and whenever a data path is available, the high priority data will be transmitted first. In case of a data path failure, the transmission and data path priorities do not guarantee the restoration of data traffic. The high-level transmission protocol generally relies on the underlying physical architecture to restore the data paths. Thus, a user can only configure the data transmission priority for the data and depend upon the physical network architecture to restore data paths in case of a failure.

Ring topologies are capable of quickly restoring failed circuits. This capability is important in providing reliable service to customers, and is particularly important in telephony applications, where a failure can result in alarms, dropped calls, and, ultimately, customer dissatisfaction and lost revenue. In a similar vein, because of bandwidth demands, protocol overhead related to provisioning, restoration, and other functions should be kept to a minimum, to make the maximum amount of bandwidth available for use by customers.

An alternative to the ring topology, the mesh topology reduces the amount of bandwidth needed for protection. The mesh topology is a point-to-point topology, with each node in the network coupled to one or more other nodes. Because a circuit may be routed through various combinations of the network's nodes and over the various links which connect them, excess capacity through a given node or over a given link can serve to protect several circuits. However, the restoration of a circuit following a failure in a mesh topology can consume a relatively large amount of time.

Particularly, each of the various uses of such a network can have their own requirements as to bandwidth, restoration time, restoration guarantees and so on. With specific regard to restoration, certain low-priority services have only minimal requirements, and so restoration may simply consist of waiting for failures to be repaired, which allows such service to be economically priced (e.g., bulk data transfer). Alternatively, certain high-priority applications demand a high level of availability, and must be restored as quickly as possible, under all (or substantially all) circumstances, with cost being of little consequence (e.g., voice traffic). Often, however, network traffic is at neither of these extremes (e.g., internet service). In this case, greater up-time than a low-priority application, but at more reasonable costs than allowed by a high-priority service, is desired.

SUMMARY

In one embodiment, a method and apparatus for restoring a virtual path are disclosed. The method includes identifying an alternate physical path and determining whether the alternate physical path is able to support the virtual path by determining whether each node of the second subset of nodes has sufficient resources necessary to support the virtual path. The virtual path is over a physical path in an optical network, and the optical network includes a number of nodes. The physical path includes a first subset of nodes of the nodes. The alternate path includes a second subset of nodes of the nodes and is between a first node and a second node of the first subset of nodes.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawing.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Introduction

A network can employ various restoration schemes to restore a virtual path (VP) in case of a failure. To guarantee the restoration of a VP, each VP is assigned a restoration priority level. The restoration priority level determines a VP's relative priority with regard to restoration in the event of a failure within the network. The present invention provides a method of restoring a virtual path using dynamic unicast. In such a dynamic unicast method, a VP is assigned a single path when provisioned. The restoration of the VP is guaranteed. The VP is restored by creating a new physical path and provisioning the virtual path on the new physical path.

Network Configuration

Figure 1:
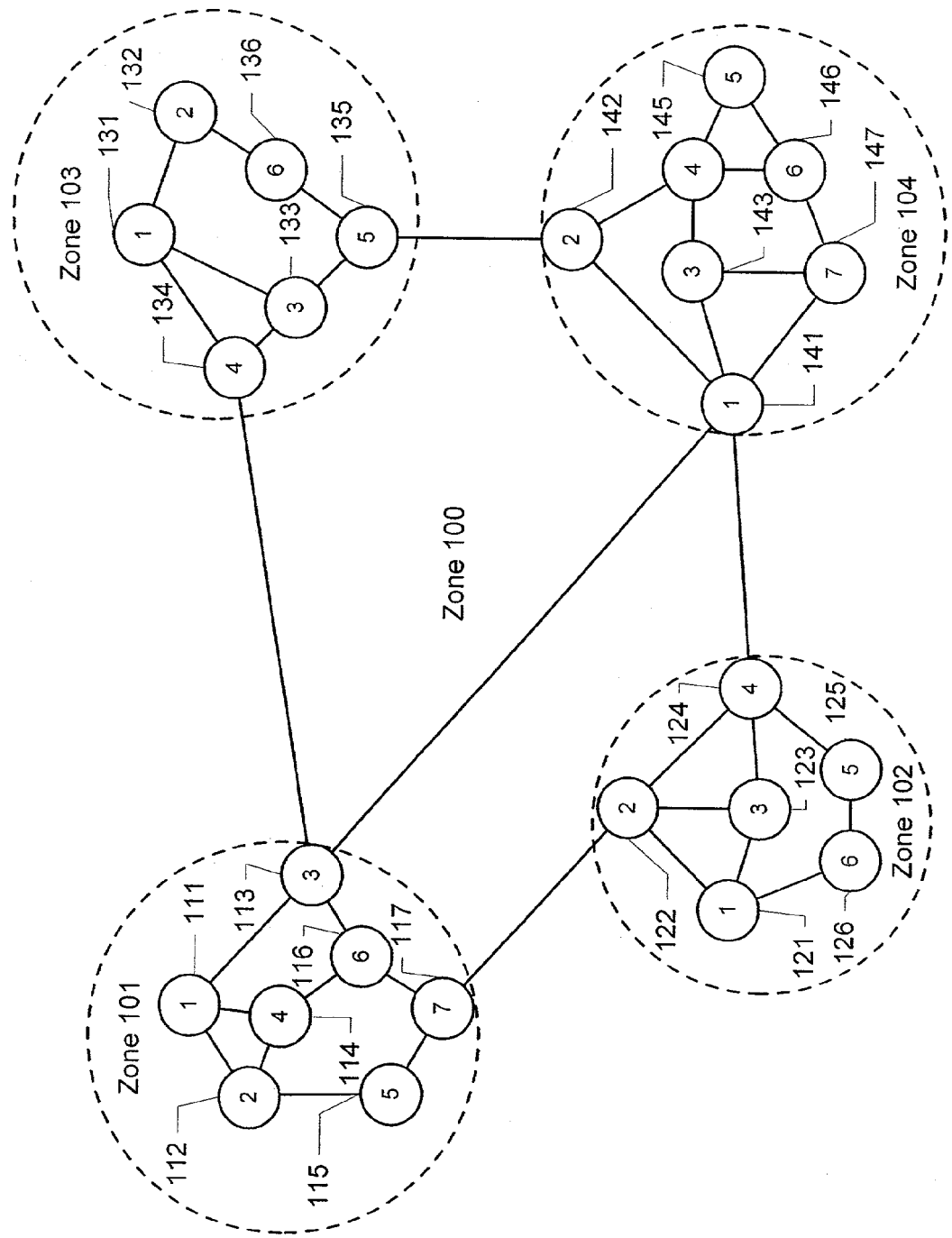
FIG. 1 is a block diagram of a zoned network.

FIG. 1 illustrates an exemplary zoned mesh network. The network can be configured in a non-zoned network in which network nodes are coupled in a mesh topology. The exemplary zoned mesh network of FIG. 1 has been organized into a backbone, zone 100, and four configured zones, zones 101-104. The solid circles in each zone represent network nodes, while the numbers within the circles represent node addresses, and include network nodes 111-117, 121-126, 131-136, and 141-147. The dashed circles represent network zones. The network depicted in FIG. 1 has four configured zones (zones 101-104 (addressed as zones 1-4) and a backbone (zone 100). Network nodes 113, 117, 122, 124, 134, 135, 141, and 142, are referred to herein as boundary nodes because they connect to more than one zone (and which can act as proxy nodes). All other nodes are interior nodes because their links attach only to nodes within the same zone. However, the exemplary network of FIG. 1 can be configured as non-zoned mesh network. In a non-zoned mesh network, nodes are combined into a single network, with no boundary/proxy nodes. An example of such nodes is given in patent application Ser. No. 09/232,395, entitled "A CONFIGURABLE NETWORK ROUTER," as incorporated by reference previously.

Provisioning of Network Nodes

Once a mesh network topology has been defined (e.g., the zoned topology of FIG. 1), the user can configure one or more end-to-end connections that can span multiple nodes or zones, an operation is referred to herein as provisioning. For each virtual path to be provisioned, a physical path must be selected and configured. Each set of physical connections that are provisioned creates an end-to-end connection between the two end nodes that supports a virtual point-to-point link (referred to herein as a virtual path or VP). The resulting VP has an associated capacity and an operational state, among other attributes.

In a network, VPs may be provisioned statically or dynamically. For example, a user can identify the nodes that will comprise the virtual path and manually configure each node to support the given virtual path. The selection of nodes may be based on any number of criteria, such as Quality of Service (QoS), latency, cost, distance traveled in the network and the like. Alternatively, the VP may be provisioned dynamically using any one of a number of methods. The provisioning information may then be forwarded to all the nodes in the network to store information in node's network topology database. Each node periodically updates this information to efficiently maintain resources and in case of path failure, effectively allocate appropriate resources needed for specific virtual path for path restoration. The method of routing information in such networks is described in a commonly-assigned U.S. patent application Ser. No. 09/232,395, entitled "A CONFIGURABLE NETWORK ROUTER," filed Jan. 15, 1999, which is hereby incorporated by reference, in its entirety and for all purposes.

The end nodes of a VP can be configured to have a master/slave relationship. The terms source and destination are also used herein in referring to the two end-nodes. In such a relationship, the node with a numerically lower node ID typically assumes the role of the master (or source) node, while the other assumes the role of the slave (or destination) node, although the opposite arrangement is also acceptable. An intermediate node is referred to herein as tandem node. Typically, the source node assumes the provisioning responsibilities and the destination node simply waits for a message from the source node informing the destination node of the VP's new physical path (although again, this need not necessary be the case). This information includes node identifiers of tandem nodes, if any, within the path. In a zoned mesh topology, if a virtual path spans over multiple zones, the border node or proxy node of each zone acts as source node for their particular zone. As will be apparent to one of skill in the art, the opposite convention or another paradigm can easily be employed.

Typically, during provisioning, each VP is assigned a performance and restoration priority level. The priority, referred to herein as Class of Service (CoS), determines VP's relative priority for performance within the network and restoration in the event of a failure within the network. The method of assigning CoS to a VP is described in commonly-assigned U.S. patent application Ser. No. 09/858,743, filed on May 16, 2001, entitled "A RESOURCE RESERVATION SCHEME FOR PATH RESTORATION IN AN OPTICAL NETWORK," as incorporated by reference previously. In case of a VP failure at a node in the network, the node determines how to restore the VP based on the CoS assigned to the VP. The assigned CoS defines the restoration method used by the node to restore failed VP.

Class of Service

To guarantee the restoration of a VP in case of a failure, each VP is assigned a restoration priority level. The restoration priority level, also referred to herein as the VP's Class of Service (CoS), determines the VP's relative priority with regard to performance within the network and restoration in the event of a failure within the network. A VP is typically assigned a CoS during provisioning, although in some cases, the CoS can be assigned after the provisioning. Depending upon the CoS assigned to a VP during provisioning, the resources for restoration can be reserved at the time of provisioning. Resources can include, for example, bandwidth, ports, inbound/outbound links, inbound/outbound wavelengths, internal storage and other such resources. In case of a path failure, a failed VP's CoS is used to determine whether and how the failed VP will be restored. If the failed VP is to be restored, the failed VP's CoS can be used to determine which restoration scheme to employ and the amount of time allocated for the restoration. In one scenario, four CoS levels (0-3) are nominally defined, although a larger or smaller number of CoS levels can be used. According to one embodiment of current invention, CoS 0 is defined as the lowest CoS, with CoS 3 being the highest. The resources for restoration of a VP are reserved according to the VP's CoS. The restoration priority spans from no resources (i.e. an unprotected path) for a VP with the lowest CoS, to redundant VP resources for a VP with the highest CoS. An example for a CoS scheme having four classes is now described in detail.

CoS 0—Low-Priority Traffic

CoS 0 is assigned to a VP that carries low-priority information. VPs from this class are typically not restored upon network failure. The user can control, on a VP-by-VP basis, whether a given VP should be protected from a failure. Upon failure of a CoS 0 VP, a network alarm is generated. However, the VP remains inactive until all other failures along the working path have been repaired.

A basic characteristic of a CoS 0 VP is that its working bandwidth is pre-emptible; the VP's resources can be reclaimed for use by other, higher-priority VPs (higher CoS VPs). So, in case of a failure of a high-CoS VP, if additional bandwidth is not available to restore that VP for restoration purposes, the network will tear down the traffic on the CoS 0 VP and assign the CoS 0 VP's bandwidth resources to the alternate path of another failed higher-CoS VP in the network. Another configurable attribute of VPs with CoS 0 is protection channel access (PCA). The PCA allows the access to standby physical paths of other VP's in the network. A VP with a CoS of 0 can be allowed to use the standby physical paths of other VP's in the network. If a standby physical path is available in the network, the network may allow backed-up information traffic on CoS 0 VP to temporarily use the available resources to relieve congestion and more quickly move information across the network.

CoS 1—Best Effort Traffic

VPs having a CoS of 1 are assigned a single path when provisioned but are restorable in case of a failure. Restoration is not guaranteed, although it is understood that best efforts will be expended to restore the failed CoS 1 VP. Moreover, the restoration time can be longer than what might be needed for critical path traffic (e.g., voice traffic).

In one embodiment, a dynamic unicast method of restoration is employed. In this approach, the node that discovers the failure initiates a restoration request and forwards the request to an upstream node (i.e., a node towards the VP's source node). This node can be the source node of the VP, or, if zones are used, a proxy node for the source node in the given zone (and so this node may not actually be the source node for the entire VP), or simply the next upstream node. This upstream node is referred to subsequently herein as a source node or proxy node to simplify the discussion. The source node initiates a restoration process by generating a resource request (e.g., by generating an Add_Path request, described elsewhere herein), based on the new route computed by the source node, and then forwarding the request to the next node in the new path. Upon receiving the request, the downstream node allocates the requested bandwidth on the specified input and output links, and forwards the request to the next downstream node. This continues along the computed path until the request reaches the intended downstream node, where the new path is saved and a positive response is returned to the source node. This downstream node can be the destination node of the VP, or, if zones are used, a proxy node for the destination node in the given zone (and so this node may not actually be the destination node for the entire VP), or simply the next downstream node. This upstream node is referred to subsequently herein as a source node or proxy node to simplify the discussion. If the request reaches a node that doesn't have enough resources (e.g., bandwidth on either the input or output link), that node sends back a negative response to the source node, which is then computes a new route and retries the operation. Thus, there is only one restoration request outstanding at any given time in the network. A dynamic unicast restoration method is described in commonly-assigned U.S. patent application Ser. No. 09/891,022, entitled "A METHOD FOR RESTORING A VIRTUAL PATH IN AN OPTICAL NETWORK USING DYNAMIC UNICAST", as incorporated by reference previously.

The "restoration time guarantees" for CoS 1 depend on the network configuration and available bandwidth. One of skill in the art will appreciate that a combination of another set of performance and implementation related attributes such as PCA, releaseability of resources and others can also be defined for this CoS based on network configuration and planning, user need, and other such requirements.

CoS 2—Premium Traffic

VPs having a CoS of CoS 2, in an embodiment employing what is referred herein as dynamic broadcast restoration method, are provisioned on a single physical path but preferably are restored using all possible resources available at all or substantially all nodes to ensure fast recovery of the VP. Certain quantitative guarantees can be made on the restoration time of CoS 2 VPs, depending on network configuration. For example, according to one embodiment of present invention, this class of service can be configured to guarantee recovery in less than 50 ms, as is often required of telecommunications related network connections, without having to pre-compute or pre-establish the alternate route. In case of a failure, the source node 'floods' the network with path restoration request to find an alternate path. This method is described in commonly-assigned U.S. patent application Ser. No. 09/750,668, filed on Dec. 29, 2000, and entitled "A VIRTUAL PATH RESTORATION SCHEME USING FAST DYNAMIC MESH RESTORATION IN AN OPTICAL NETWORK", which is hereby incorporated by reference, in its entirety and for all purposes.

The restoration request is sent to tandem nodes that may provide a path to the destination node while also offering enough bandwidth capacity to satisfy the failed VP's needs. Each request is processed individually by the tandem nodes. If the resources are available, the tandem node accepts only the first successful request to avoid multiple allocation of resource for the alternate path. The source node accepts first successful response to path restoration request as the alternate path. The VP is then switched to this newly-created alternate path.

CoS 3—Mission Critical Traffic

VPs having a CoS of 3 are used for mission-critical application, where virtually no disruption of traffic can be tolerated. At the time of path provisioning, CoS 3 VPs are assigned two distinct paths, a primary path and a secondary path. Each path is preferably link-and-node disjoint. Only one of these paths is active at any time, while the other is in standby mode. A failure along the active path will cause traffic to be switched over to the standby path. The paths are provisioned by two independent provisioning commands. Each CoS 3 VP has an alternate VP to provide support in the case of a failure. The switching of paths can be done by either the source or destination node, independently, based on the error rate each node receives. There should be virtually no down time on CoS 3 VPs. This method is referred to herein as 1+1 protection. This method is described in commonly-assigned U.S. patent application Ser. No. 09/859,166, filed May 16, 2001, and entitled "A METHOD FOR RESTORING A VIRTUAL PATH IN AN OPTICAL NETWORK USING 1+1 PROTECTION", which is hereby incorporated by reference, in its entirety and for all purposes.

One variation on such a scheme is 1:N protection, which allows a group of N VPs to share one or more alternate protection paths. In this scheme, the bandwidth of alternate path is share by multiple CoS 3 VPs based on their maximum bandwidth requirements. The reservation of resources is done at the time of provisioning of the paths. The network can also dynamically alter the bandwidth use of the alternate path for each VP based on the traffic analysis at the time of failure while guaranteeing the maximum bandwidth initially allocated and so maintaining network efficiency.

Yet another variation of this scheme is 1:1 protection. This scheme reserves an alternate path for CoS 3 VP in a manner similar to 1+1 protection. However, with 1:1 protection, the alternate path is not always available as a secondary path. When CoS 3 VP is not using this secondary path, certain VP's with lower CoS are allowed to use the alternate path. In case of a failure on the primary path of CoS 3 VP, the network removes any lower-CoS traffic from the alternate path and generates appropriate alarms. Then, the traffic of CoS 3 is switched on to the alternate path. This ensures maximum efficiency of the network yet guarantees meeting maximum acceptable restoration time for mission-critical information (e.g., voice and data information) on CoS 3 VPs. These methods are described in commonly assigned U.S. patent application Ser. No. 09/876,380, filed Jun. 7, 2001, and entitled "A METHOD FOR RESTORING A VIRTUAL PATH IN AN OPTICAL NETWORK USING 1:N PROTECTION", which hereby incorporated by reference, in its entirety and for all purposes.

Class of Service Attributes

Each CoS typically includes certain restoration-related attributes. Examples of classes-of-service (CoS's) and the attributes that can be used in identifying such CoS's, as well as a description of the attributes used in defining a class of service. These attributes can include, for example, restoration method, releasability of resources, protection channel access and predefined restoration time. Other attributes, such as reliability, latency, availability, and the like, can be added to each class on an implementation-by-implementation basis, as the network planning, user needs and other constraints dictate.

Failure Detection, Propagation, and Path Restoration Using a "Best Efforts" Technique CoS1 VPs are restored using a quality-of-service-based (QoS-based) shortest-path technique, referred to herein as a QoS-based shortest path first (or QSPF) algorithm. Restoration involves three basic steps: route calculation using the procedure outlined subsequently, path establishment (which involves the exchange of an Add Path packet, described below), and conflict resolution using backtracking. C0S1 VPs are restored using the best efforts of the network management infrastructure, but their restoration is not guaranteed. The actions performed in restoring CoS1 VPs are similar to those used to create a new virtual path, but need not originate with the VP's source node or terminate at the VP's destination node (e.g., if used in a zoned environment, proxy nodes localize restoration to the zone containing the affected link(s) and/or node(s)). An example of the actions thus performed discussed below.

Failure Detection and Propagation

In networks, failures are typically detected using the mechanisms provided by the underlying physical network. The failure detection mechanism in a mesh optical network is described in commonly-assigned U.S. patent application Ser. No. 09/232,397, entitled "A METHOD FOR ROUTING INFORMATION OVER A NETWORK," as incorporated by reference previously.

Path Calculation

Routes are computed using a QoS-based shortest-path (QSPF) technique, as noted. The route selection process relies on configured metrics and an up-to-date view of the topology to find the shortest paths between any two nodes. The topology database contains information about all network nodes, their links, and available capacity. A detailed description of such techniques is provided in U.S. patent application, Ser. No. 09/478,235, filed Jan. 4, 2000, and entitled "METHOD FOR PATH SELECTION IN A NETWORK," which is hereby incorporated by reference, in its entirety and for all purposes Path Restoration A CoS1 VP employs dynamic unicast as its method of restoration. The restoration is not guaranteed, and the restoration time can be longer than what might be needed for critical path traffic such as a voice call. Moreover, the restoring nodes can be proxy nodes. The "restoration time guarantees" for a VP using dynamic unicast method depend on the network configuration and provisioning attributes (e.g., bandwidth requirement, QoS, latency and the like) of the VP. The source node of failed VP (or its proxy within the zone) initiates the restoration process. The tandem node that discovers the path failure, initiates a path failure notification for the source node (or its proxy) and waits for a response. The destination (or its proxy) node preferably responds to restoration process initiated by the source node (or its proxy). As used herein, the use of the terms "source node" and "destination node" contemplate their proxies within the affected zone, as well as simply the next upstream or downstream node, respectively.

Initiating Restoration

Once a node detects a path failure, the node initiates a path restoration request for the source node (or proxy) of the failed VP using a Restore_I request. The method of generating Restore_I requests and responses is described in commonly-assigned U.S. patent application Ser. No. 09/750,668, entitled "A VIRTUAL PATH RESTORATION SCHEME USING FAST DYNAMIC MESH RESTORATION IN AN OPTICAL NETWORK", and filed Dec. 29, 2000, and is hereby incorporated by reference in its entirety and for all purposes.

When the source node receives a Restore_I request, the source node determines the type of restoration scheme assigned to the failed VP. Upon determining that the failed VP is to use the dynamic unicast restoration scheme, the source node creates an Add Path Request packet with appropriate contents and transmits the request to other nodes in the network.

Alternatively, if the node that detects the failure determines that a path from that node to another node along the VP's existing physical path exists, that node can go forward with path restoration on its own. Further, if the next node in the physical path fails and the detecting node can initiate restoration, such a restoration can be effected as well.

Add Path Request Packet

Figure 2:
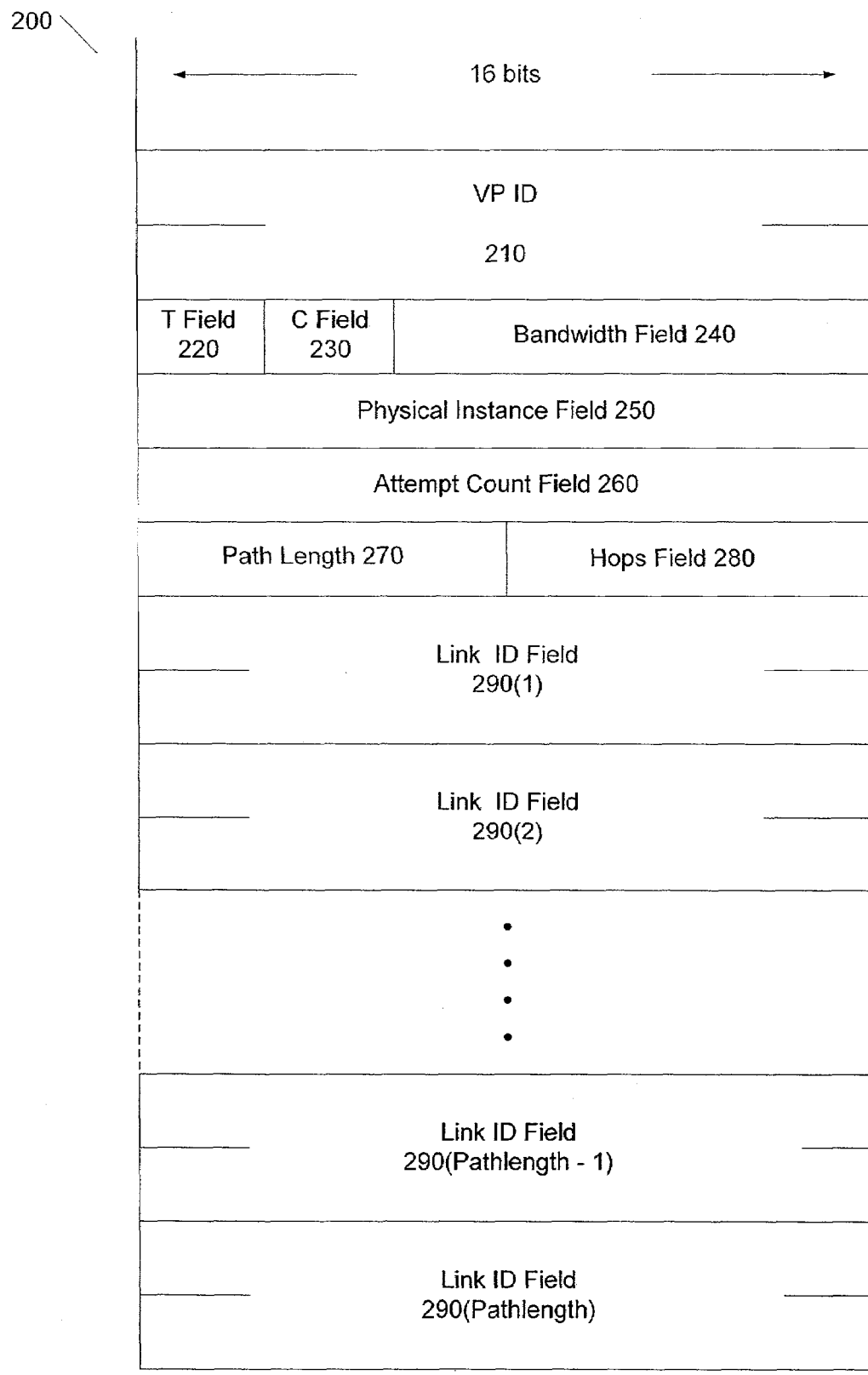
FIG. 2 illustrates an example of an Add Path Request (APR) packet.

FIG. 2 illustrates an example of an Add Path Request (APR) packet 200. APR packet 200 is also used to provision a new path for a VP. APR packet 200 includes a VP-ID 210, the 32 bit ID of the VP. It will be apparent to one of the skill in the art that, while specific lengths are described, the fields discussed here may be of any appropriate length. A 2-bit long 'T' field 220 is used to indicate the type of path. This field indicates whether the path is primary path or secondary path for a CoS 3 VP. A 2-bit long 'C' field 230 defines the restoration Class of Service. A 12-bit long bandwidth field 240 indicates the bandwidth requested for the VP for example, in STS-48 granularity.

A physical instance field 250 stores a 16-bit physical instance identifier for the VP. The source node of the VP maintains physical instance field 250, which is associated with the path (i.e., set of link IDs) of the VP and is part of APR packet 200 and all restoration-related packets. Preferably, the source node updates physical instance field 250. The first path of a VP that is successfully provisioned (as seen by the source node) has a physical instance identifier of 1. All future path messages should have the correct value of this identifier. If a new path is selected for the VP, the physical instance identifier is incremented (e.g., by 1) by the source node. Due to the distributed nature of path selection and multiple failures, several physical instances of the same VP may temporarily exist in the network at any given time. However, only one instance ultimately survives.

An attempt count field 260 is the attempt count of the current physical instance of the VP. The source node increments this field every time the source node resends the same request. Since APR packets are retransmitted periodically, different attempts preferably should be distinguished from one another. Attempt count field 260 allows retransmitted requests to be distinguished from one another. Attempt count field 260 starts at a given point (e.g., from 1) and is incremented (e.g., by 1) with each retransmission. Because given APR packets may traverse different paths to get to the same intermediate node, attempt count field 260 allows the intermediate node to differentiate among multiple request attempts for restoration of the same physical instance of the same VP.

A path length field 270 indicates the number of links in the VP. Path length field 270 determines the number of link identifications that appear at the end of the packet. A hops field 280 indicates the number of hops traversed by a given APR packet. Hops field 280 is incremented (e.g., by 1) at each receiving node in the given APR packet. During the transmission of the given APR packet, the value of hops field 280 is incremented (e.g., from 0 to (Path Length-1)). Upon the return of a response, hops field 280 is decremented (e.g., by 1) by each node that forwards the response to the source node. During the transmission of a response, the value of hops field 280 is decremented from the maximum number of hops traversed to zero by the time the response reaches the source node (e.g., from (Path Length-1) to 0). A link ID field 290 is a 32-bit long field for the link IDs of the VP. The number of link IDs depends upon the path length set by the source node.

Upon sending APR packet 200, the source node sets a timer. If a positive response is not received before the timer expires, the source node generates another APR packet. Each time the APR packet is generated, attempt count field 260 is incremented (e.g., by 1). The APR packets are preferably generated for only a certain number of times, after which the source node generates a network alarm.

Receiving an Add Path Request Packet at a Tandem Node

Figure 3:
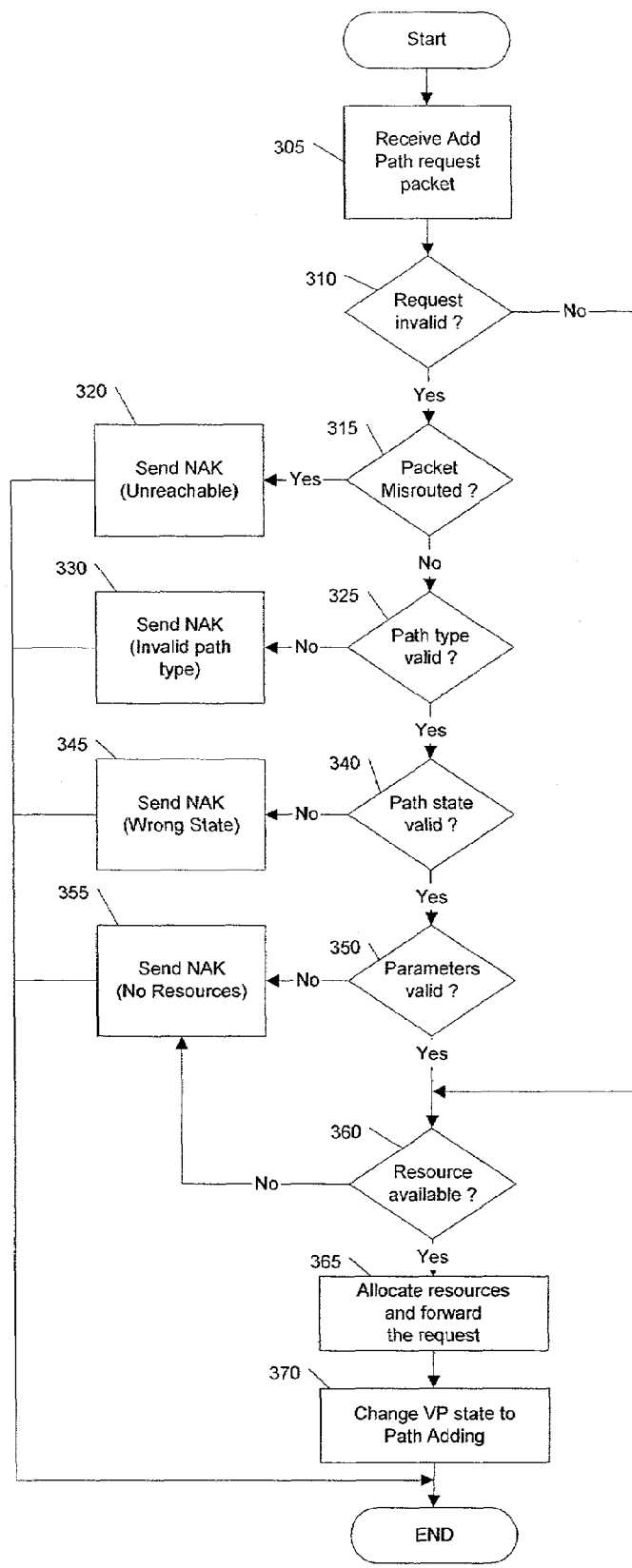
FIG. 3 is a flow diagram illustrating the actions performed by a tandem node upon receipt of an APR packet.

FIG. 3 is a flow chart illustrating the actions performed by a tandem node upon receipt of an APR packet. Initially, the tandem node receives an APR packet (step 305). The tandem node first determines if the request is invalid and contains any error (step 310). If the request is valid, the node proceeds with resource checking (step 360). Otherwise, the process makes at lease one of several determinations as to the reason for the request's invalidity. The tandem node determines if the APR packet is misrouted (i.e., there is no path to the destination, or the tandem node does not recognize any of the link IDs in the list due to an incomplete network topology update) (step 315). If the APR packet is misrouted, the tandem node returns a NAK (UNREACHABLE) upstream (step 320). If the APR packet is not misrouted, the tandem node determines if the path type field in the APR packet is invalid (step 325). If the path type field is invalid, the tandem node responds with a NAK (INVALID PATH TYPE) (step 330). If the path type field is valid, the tandem node determines if the APR packet is an unexpected request (i.e., the request arrives while the path is in restoring or deleting states) (step 340). If the APR packet is an unexpected request, the tandem node responds with a NAK (WRONG STATE) (step 345). If the APR packet is not unexpected, the tandem node determines if one or more of the parameters of the APR packet (such as the CoS, origin, target or bandwidth fields) are invalid (step 350). If one or more of the parameters of the APR packet are invalid, the tandem node returns a NAK (NO RESOURCES) to the source node (step 355).

If the APR packet is valid and no errors are found, the tandem node determines if sufficient resources are available to support the virtual path (step 360). If there are insufficient resources (such as memory, bandwidth on input and/or output links, unavailability of ports and the like), the tandem node responds with a NAK (NO RESOURCES) (step 355). However, if sufficient resources are available, the tandem node makes bandwidth reservations on input and output links, increments the hops field in the APR packet and forwards the request to the next appropriate link (step 365). The tandem node sets the path-state to 'path adding' and waits for response from the next link (step 370).

Receiving an Add Path Request Packet at a Destination Node

Figure 4:
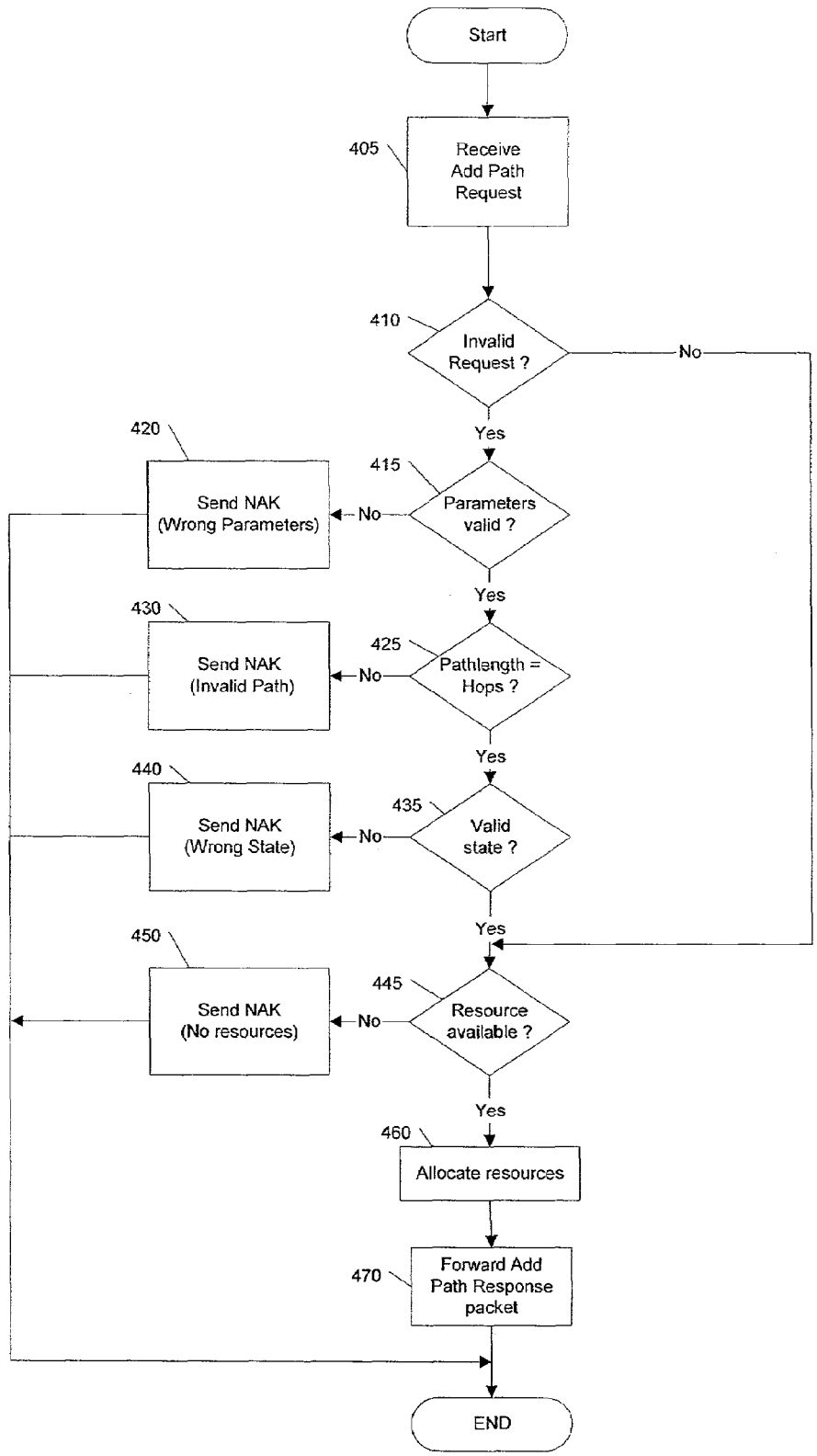
FIG. 4 is a flow diagram illustrating the actions performed by a destination node when the destination node receives an APR packet.

FIG. 4 is a flow chart illustrating the actions performed by a destination node when the destination node receives an APR packet. Initially, the destination node receives the APR packet (step 405). The destination node determines if the request is invalid and contains errors (step 410). If the request is valid, the destination node proceeds with resource checking (step 445). If the request contains errors, the destination node determines if one or more of the parameter fields in the APR packet are valid (step 415). These parameters may include bandwidth, type, CoS, and Link IDs and the like. If one or more of the parameters are invalid, the destination node responds with a NAK (WRONG PARAMETERS) upstream (step 420). The destination node determines if the APR packet contains a path length that does not match a hops field of the APR packet (step 425). If the path length does not match the hops field, the destination node sends a NAK (INVALID PATH) (step 430). The destination node determines if the APR packet is received in an invalid path state (i.e., the request arrives while the path is in restoring or deleting states) (step 435). If the APR packet arrives during an invalid path state, the destination node responds with a NAK (WRONG STATE) (step 440).

If no errors are found in the APR packet (step 410), the destination node determines if sufficient resources are available to support the virtual path (step 445). If sufficient resources (such as memory, bandwidth and like) are not available, the destination node responds with a NAK (NO RESOURCES) (step 450). If sufficient resources are available, the destination node allocates resources and makes appropriate connections in a cross-connect matrix for the virtual path (step 460). The destination node reformats an Add Path Response packet with a list of ports assigned to the virtual path and sends the Add Path Response packet upstream (step 470).

Add Path Response Packet

Figure 5:
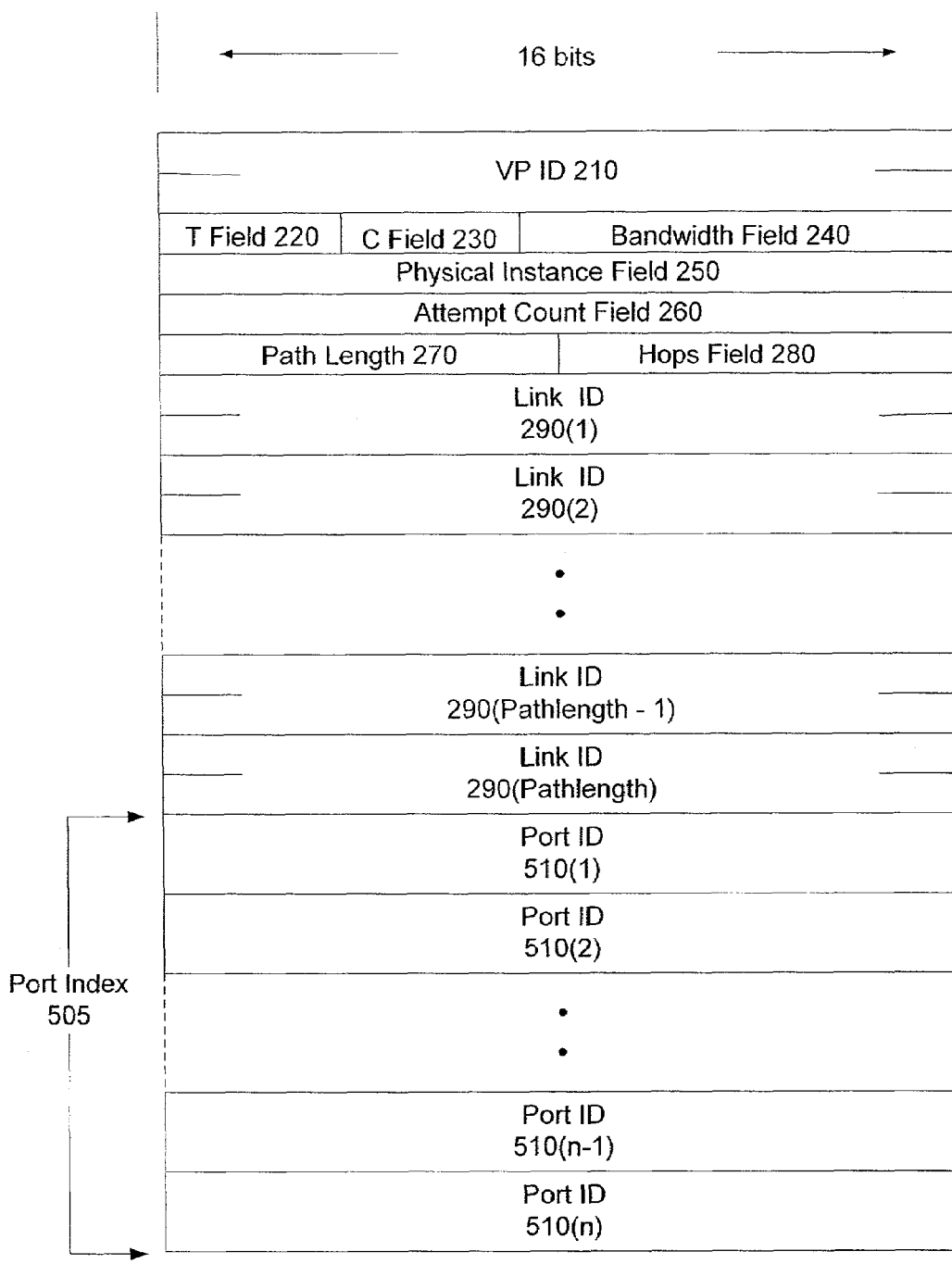
FIG. 5 illustrates an example of an Add Path Response packet ("response packet").

FIG. 5 illustrates an example of an Add Path Response packet ("response packet") 500. The command-specific contents of response packet 500 are similar to those of APR packet 200. In response packet 500, a list of Port IDs 510 is added. Every node that receives response packet 500 adds a list of Port IDs to the packet. These ports are assigned on the upstream link of the node. The Port IDs are local port IDs for the node that is the next node to receive the response packet 500. The number of ports assigned for the VP is same as the number of bandwidth units requested (e.g., in terms of STS-48 granularity).

For positive responses, the responding node copies the contents of the APR packet 200 and appends a port index 505 (e.g., Port IDs 510(1)-(n)) and decrements hops field 280. For negative responses, the responding node copies the contents of the APR packet and instead of a list of assigned Port IDs, the node appends a reason code for rejection in place of port index 505 and decrements hops field 280.

Receiving Add Path Response Packet at the Source Node

Figure 6A:
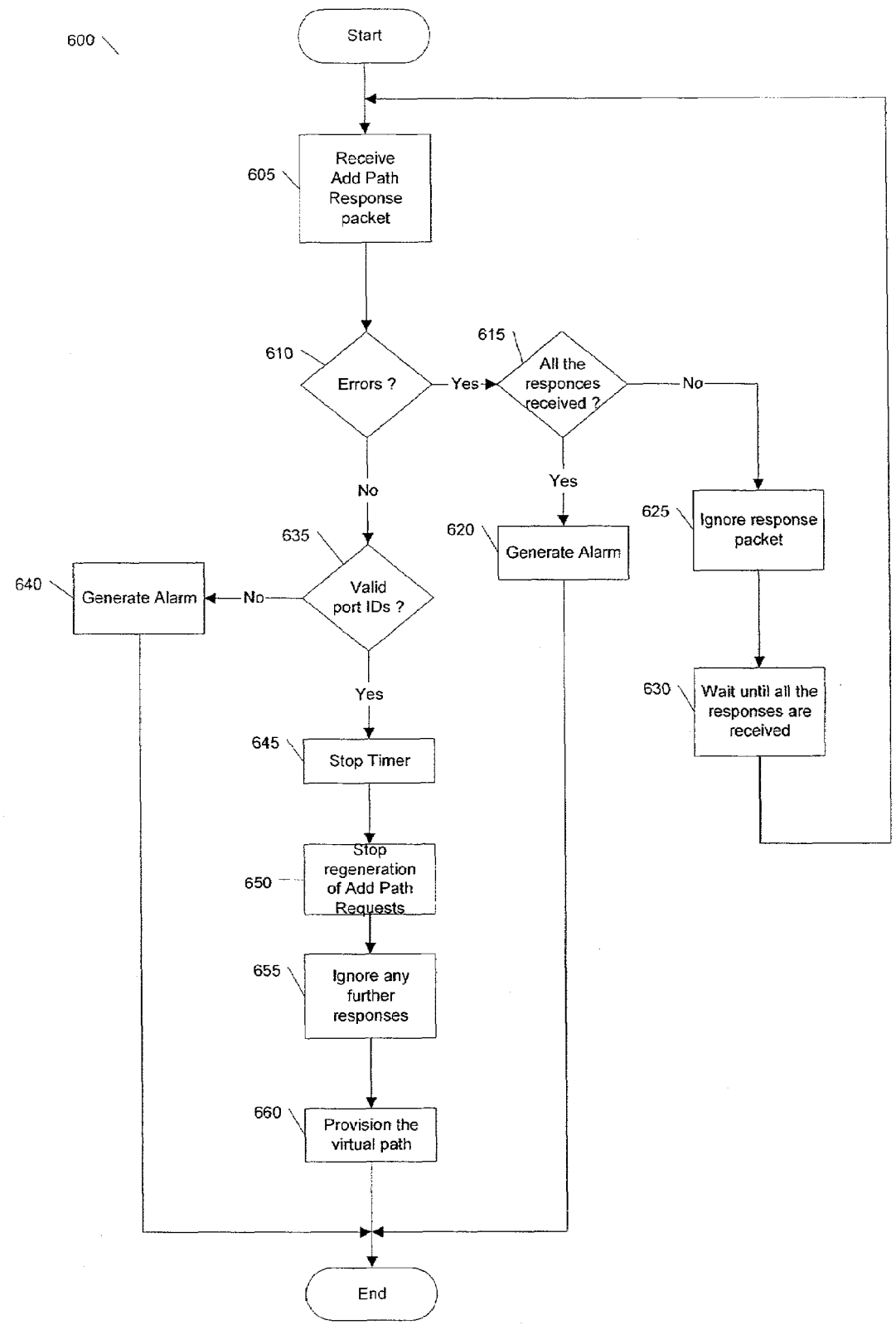
FIG. 6A is a flow diagram illustrating the actions performed by a source node when the source node receives a response packet.

FIG. 6A is a flow chart illustrating the actions performed by a source node when the source node receives a response packet. Initially the node receives the response packet (step 605). The source node determines if the response packet contains any errors (step 610). If the response packet contains any error (i.e., the response is a negative response), the source node determines if responses from all previously generated APR packets have been received (step 615). If the responses from all previously generated APR packets have been received, the source node generates a network alarm (step 620). If the responses from all previously generated APR packets have not been received, the source node ignores the response and takes no action (step 625). The source node waits until the all the responses from previously generated APR packets have been received (step 630).

If no errors are indicated in the response packet (i.e., the response is a positive response), the source node determines if the port index in the response packet contains valid Port IDs (step 635). If the port index contains one or more invalid port IDs, the source node generates a network alarm (step 640). If the port IDs in the port index are valid, the source node terminates any timer the source node had to monitor the response time (step 645). The source node stops generating new APRs (step 650). The source node ignores any further response from previously generated APR packets (step 655). The source node restores the virtual path by provisioning the virtual path on the ports allocated by the tandem nodes and the destination node (step 660).

Receiving Add Path Response Packet at the Tandem Node

Figure 6B:
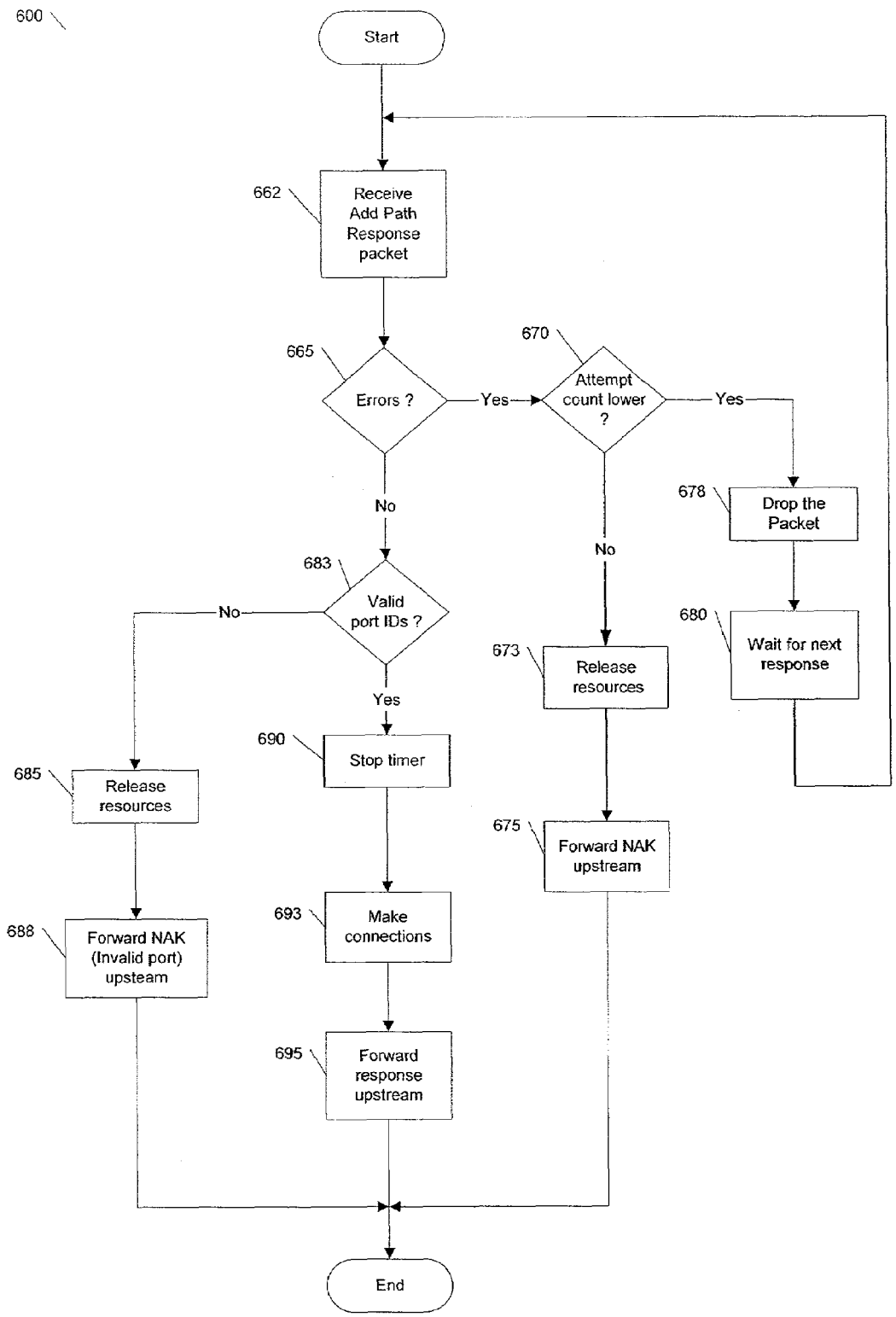
FIG. 6B is a flow diagram illustrating the actions performed by a tandem node when the tandem node receives a response packet.

FIG. 6B is a flow chart illustrating the actions performed by a tandem node when the tandem node receives a response packet. Initially the tandem node receives the response packet (step 662). The tandem node determines if the response packet contains any errors (step 665). If the response packet contains any error (i.e., the response is a negative response), the tandem node determines if the attempt count field of the response packet is lower than the attempt count field of the last APR packet forwarded by the tandem node (step 670). If the attempt count field of the response packet is higher than the attempt count field of the last APR packet forwarded by the tandem node, the tandem node releases the resources allocated to the VP (step 673). The tandem node forwards a negative response upstream (step 675). If the attempt count field of the response packet is lower than the attempt count field of the last APR packet forwarded by the tandem node, the tandem node drops the response packet and takes no action (step 678). The tandem node drops the packet because the tandem node may, in future, receive a response packet with no errors (i.e., a positive response) to a later-forwarded APR packet. The tandem node waits for next response packet (step 680).

If the response packet contains no errors, the tandem node determines if the port index in the response packet contains valid port IDs (step 683). If the port index in the response packet contains one or more invalid port IDs, the tandem node releases the resources allocated to the VP (step 685). The tandem node forwards a negative response, NAK (INVALID PORT), upstream (step 688). If the port IDs in the response packet are valid, the tandem node terminates any timer the tandem node had to monitor the response time (step 690). The tandem node makes appropriate connections in the cross-connect matrix (step 693). After making the connections, the tandem node forwards the response packet to next node in the VP (step 695).

An Example of Path Restoration Using Dynamic Unicast Method

The following description is intended to be illustrative of the invention and should not be taken to be limiting. Other embodiments within the scope of the present invention are possible.

Figure 7:
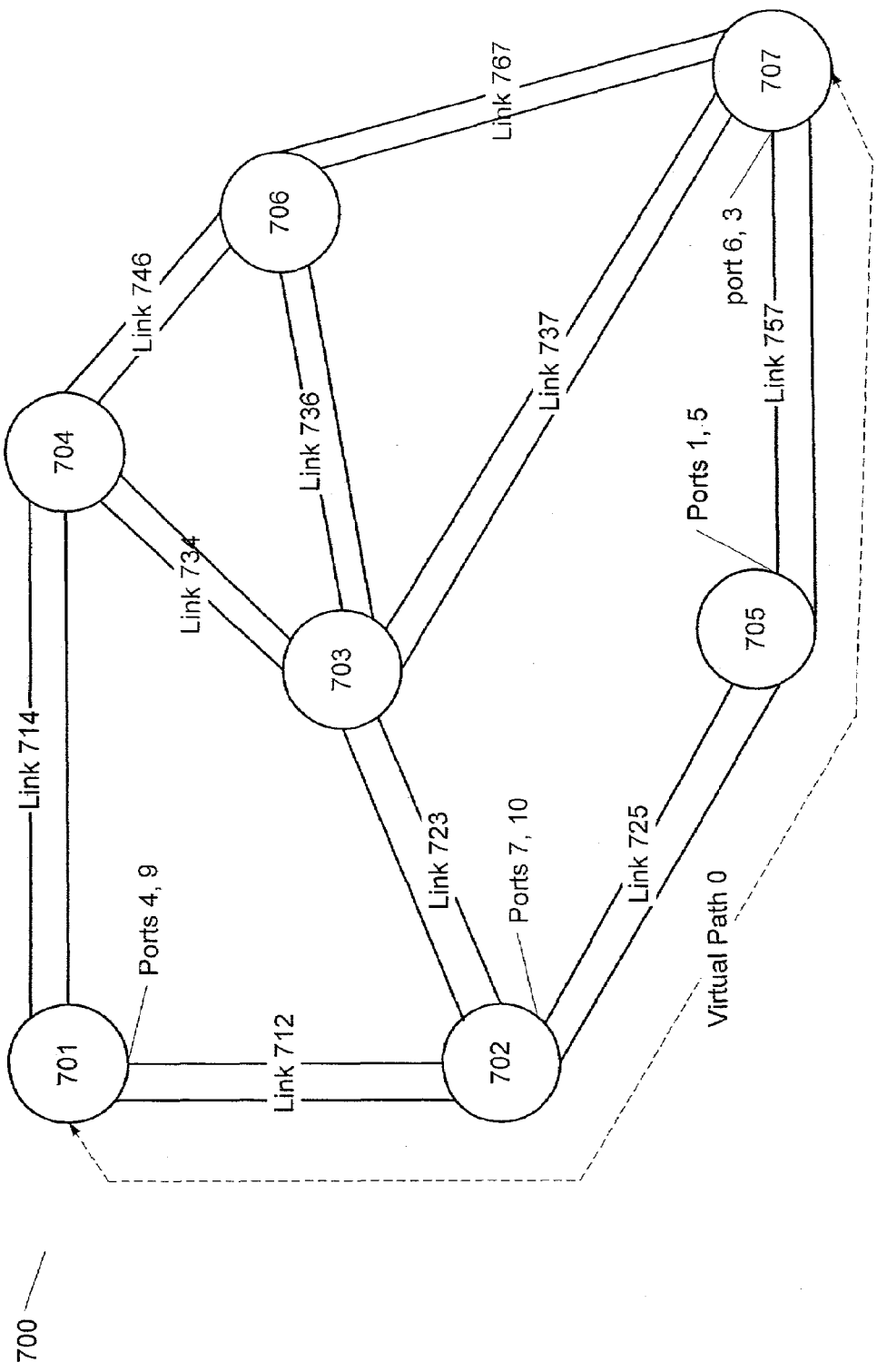
FIG. 7 illustrates an example network in which a virtual path (VP) fails and is then restored.

FIG. 7 illustrates an example network 700 in which a VP fails and then is restored. Network 700 comprises seven nodes, nodes 701-707. Each node is connected to an adjacent node by an optical link. Each optical link includes multiple physical ports. The failed VP (VP 0) is restored by provisioning VP 0 over nodes 701, 702, 705 and 707 using links 712, 725, and 757. Node 701 is the source (or origin) node of VP 0 and node 707 is the destination (or target node) of VP 0. Node 701 (the source node) generates and sends an APR packet to restore VP 0 starting at node 701 and ending at node 707. While the VP's actual source and destination nodes are used in this example, it will be apparent to one of skill in the art that, as noted previously, proxy nodes, or even upstream/downstream nodes could serve as the termini for purposes of the restoration technique described herein.

Add Path Request Packet Flow

In the present example, the configuration requires that the path through nodes 702 and 705 be considered to restore VP 0. Node 701 (the source node) generates an APR packet that traverses through nodes 702 and 705 to reach node 707 (the destination node). Node 701 sets the path length field to three to indicate the number of hops to be traversed by the APR packet. Node 701 updates the path field by adding link 712 to the list. Link 712 is used to send the APR packet to node 702. Node 701 sends the APR packet to node 702. Node 702 increments the hops field (e.g., by 1) to indicate the number of hops traversed by the APR packet and adds the next link ID, link 725, in the path field and forwards the APR Packet to node 705. Node 705 adds link ID, link 757, in the path field, increments the hops field (e.g., by 1) and forwards the APR packet to node 707, the destination node. Table 1 shows the values of some of the fields in the APR packet at each node.

TABLE 1

Some of the field values for the APR packet.

| Packet Flow | Path Length field value | Hops field value | Path field value |
|---|---|---|---|
| Node 701 → 702 | 3 | 0 | Link 712 |
| Node 702 → 705 | 3 | 1 | Link 725 |
| Node 705 → 707 | 3 | 2 | Link 757 |

Add Path Response Packet Flow

Node 707 determines from the APR packet header that node 707 is the target (destination) node for the APR packet. Node 707 generates a response packet and copies the contents of APR packet to the response packet and decrements the hops field. Node 707 allocates one or more ports for VP 0 and appends the remote port ID of each allocated port to the port index field of the response packet. The remote port ID of allocated port at node 707 is the local ID of that port at node 705. For example, node 707 allocates ports with local IDs 6 and 3 to VP 0. However, port 6 at node 707 is recognized as port 1 by node 705 and port 3 at node 707 is recognized as port 5 by node 705. Thus, for local port 6 at node 707, the remote port ID is 1 and for local port 3 at node 707, the remote port ID is 5. By appending remote port IDs of corresponding local ports to the response packet, node 707 indicates which ports should be allocated by node 705. Each node exchanges the information regarding the remote IDs of local ports during a periodic network topology update process. The port list in the response packet is updated at every hop along the path to the source node. Table 2 shows the values of some of the fields in the response packet at each node.

TABLE 2

Some of the field values for response packet.

| Packet Flow | Path Length field value | Hops field value | Path field value | Port Index value |
|---|---|---|---|---|
| Node 707 → 705 | 3 | 2 | Link 757 | 1, 5 |
| Node 705 → 702 | 3 | 1 | Link 725 | 7, 10 |
| Node 702 → 701 | 3 | 0 | Link 712 | 4, 9 |

After receiving the response packet, node 701 (the source node) provisions VP 0 to the new physical path including links 712, 725 and 757. The new physical path for VP 0 uses ports 4 and 9 on link 712 at node 701, ports 7 and 10 on link 725 at node 702, ports 1 and 5 on link 757 at node 705 and corresponding ports 6 and 3 at node 707. The network topology at each node is updated to reflect the new physical path for VP 0.

Conflict Resolution Using Backtracking

If the source node is other than the source node for the entire VP, there will be additional upstream nodes that can be tasked with restoring the failed VP, in the case where the node originally tasked with restoring the VP is unable to successfully complete this task. The availability of such functionality can be set as a default, subject to user preference, or performed automatically.

If backtracking is enabled, the original node responsible for restoration in this scenario determines that restoration has been unsuccessful, and thus indicates to an upstream node that the original node has been unsuccessful in restoring the VP, and requests that the upstream node attempt to restore the VP. The original node accomplishes this by initiating a path restoration request for the upstream node of the failed VP using a Restore_I request. As noted previously, the method of generating Restore_I requests and responses is described in U.S. patent application Ser. No. 09/750,668.

When the upstream node receives a Restore_I request, the upstream node determines the type of restoration scheme assigned to the failed VP. Upon determining that the failed VP is to use the dynamic unicast restoration scheme, the upstream node creates an Add Path Request packet with appropriate contents and transmits the request to other nodes in the network, in the manner previously described.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:

1. A method for restoring a virtual path, the method comprising:
   detecting a failure in said virtual path by receiving a failure message;
   acknowledging said failure message;
   releasing a resource of said virtual path;
   changing a state of a portion of said virtual path to down;
   identifying a class of service, among a plurality of classes of service, of said virtual path;
   identifying an alternate physical path, wherein
      said virtual path is over a physical path in an optical network, said optical network comprising a plurality of nodes,
      said physical path comprises a first subset of nodes of said nodes, and
      said alternate physical path comprises a second subset of nodes of said nodes and is between a first node and a second node of said first subset of nodes,
      wherein said second node receives said failure message; and
   determining whether said alternate physical path is able to support said virtual path by determining whether each node of said second subset of nodes has sufficient resources necessary to support said class of service of said virtual path.

2. The method of claim 1, further comprising:
   restoring said virtual path using said alternate physical path, if said each of said second subset of nodes has said sufficient resources necessary to support said virtual path.

3. The method of claim 1, further comprising:
   identifying another alternate physical path, if at least one of said each of said second subset of nodes does not have said sufficient resources necessary to support said virtual path, wherein
      said another alternate physical path comprises a third subset of nodes of said nodes, and
      said third subset of nodes differs from said second subset of nodes.

4. The method of claim 3 further comprising:
restoring said virtual path using said alternate physical path, if said each of said second subset of nodes has said sufficient resources necessary to support said virtual path.

5. The method of claim 1, further comprising:
selecting an upstream node of said first subset of nodes as said first node, wherein said upstream node is a one of said first subset of nodes nearest said failure.

6. The method of claim 5, further comprising:
identifying another alternate physical path by selecting another upstream node of said first subset of nodes as said first node, if at least one of said each of said second subset of nodes does not have said sufficient resources necessary to support said virtual path, wherein said upstream node is not said one of said first subset of nodes nearest said failure.

7. A method for restoring a virtual path, the method comprising:
identifying a class of service, among a plurality of classes of service, of said virtual path;
identifying an alternate physical path, wherein
said virtual path is over a physical path in an optical network, said optical network comprising a plurality of nodes,
said physical path comprises a first subset of nodes of said nodes, and
said alternate physical path comprises a second subset of nodes of said nodes and is between a first node and a second node of said first subset of nodes;
determining whether said alternate physical path is able to support said virtual path by determining whether each node of said second subset of nodes has sufficient resources necessary to support said class of service of said virtual path; and
detecting a failure in said virtual path by receiving a failure message, wherein said physical path between said first and said second node comprises a plurality of intermediate nodes and a one of said intermediate nodes receives said failure message;
changing a state of said virtual path to down;
forwarding said failure message to adjacent nodes comprising said virtual path;
initiating a timer for receiving a response to said forwarded failure message; and
if said timer expires before said response to said forwarded failure message is received, releasing resources of said virtual path, and
if said response to said forwarded failure message is received before said timer expires, stopping said timer, and
releasing resources of said virtual path.

8. A method for restoring a virtual path, the method comprising:
identifying a class of service, among a plurality of classes of service, of said virtual path;
identifying an alternate physical path, wherein
said virtual path is over a physical path in an optical network, said optical network comprising a plurality of nodes,
said physical path comprises a first subset of nodes of said nodes, and
said alternate physical path comprises a second subset of nodes of said nodes and is between a first node and a second node of said first subset of nodes;
determining whether said alternate physical path is able to support said virtual path by determining whether each node of said second subset of nodes has sufficient resources necessary to support said class of service of said virtual path; and
detecting a failure in said virtual path by receiving a failure message, wherein said first node receives said failure message;
changing a state of said virtual path to restoring;
identifying an adjacent node with required bandwidth for said virtual path;
forwarding a resource request packet to said adjacent node with required bandwidth for said virtual path; and
waiting for a resource response packet for a predetermined time interval.

9. The method of claim 8, further comprising:
if said resource response packet is received with at least one error, waiting until responses to all resource request packets are received; and
if said resource response packet is received with no errors, determining if a list of allocated ports in said resource response packet is valid.

10. The method of claim 9, further comprising:
if said list of allocated port is valid,
provisioning said virtual path on said allocated ports; and
if said list of allocated ports is invalid,
generating a network alarm.

11. The method of claim 8, wherein said physical path between said first and said second node comprises a plurality of intermediate nodes and a one of said intermediate nodes receives said resource request packet, and the method further comprises:
causing said one of said intermediate nodes to allocate a resource to said virtual path.

12. The method of claim 11, further comprising:
if said second resource response packet is not received within a predetermined time interval,
releasing said resource allocated to said virtual path, and
forwarding a negative acknowledgment to said first node.

13. The method of claim 8, wherein said second node receives said resource request packet, and the method further comprises:
determining if a resource is available for said virtual path.

14. The method of claim 13, further comprising:
if said resource is available for said virtual path,
allocating said resource to said virtual path.

15. A network element configured to restore a virtual path, the network element comprising:
a processor;
a network interface coupled to said processor and an optical network, wherein said virtual path is over a physical path in said optical network and said optical network comprises a plurality of nodes;
computer readable medium coupled to said processor; and
computer code, encoded in said computer readable medium, configured to cause said processor to:
detect a failure in said virtual path by receiving a failure message;
acknowledge said failure message;
release a resource of said virtual path;
change a state of a portion of said virtual path to down;
identify a class of service, among a plurality of classes of service, of said virtual path;
identify an alternate physical path, wherein
said physical path comprises a first subset of nodes of said nodes, and said alternate physical path comprises a second subset of nodes of said nodes and is between a first node and a second node of said first subset of nodes, wherein said second node receives said failure message; and determine whether said alternate physical path is able to support said virtual path by determining whether each node of said second subset of nodes has sufficient resources necessary to support said class of service of said virtual path.

16. The network element of claim 15, wherein said computer code is further configured to cause said processor to:

restore said virtual path using said alternate physical path, if said each of said second subset of nodes has said sufficient resources necessary to support said virtual path.

17. The network element of claim 15, wherein said computer code is further configured to cause said processor to:

identify another alternate physical path, if at least one of said each of said second subset of nodes does not have said sufficient resources necessary to support said virtual path, wherein said another alternate physical path comprises a third subset of nodes of said nodes, and said third subset of nodes differs from said second subset of nodes.

18. The network element of claim 17, wherein said computer code is further configured to cause said processor to:

restore said virtual path using said alternate physical path, if said each of said second subset of nodes has said sufficient resources necessary to support said virtual path.

19. The network element of claim 15, wherein said physical path between said first and said second node comprises a plurality of intermediate nodes and a one of said intermediate nodes receives said failure message, and said computer code is further configured to cause said processor to:

forward said failure message to adjacent nodes comprising said virtual path;

initiate a timer for receiving a response to said forwarded failure message;

if said timer expires before said response to said forwarded failure message is received, release resources of said virtual path; and if said response to said forwarded failure message is received before said timer expires, stop said timer, and release resources of said virtual path.

20. The network element of claim 15, wherein said second node receives said failure message, and said computer code is further configured to cause said processor to:

change a state of said virtual path to down; and release resources of said virtual path.

21. The network element of claim 15, wherein said computer code is further configured to cause said processor to:

select an upstream node of said first subset of nodes as said first node, wherein said upstream node is a one of said first subset of nodes nearest said failure.

22. The network element of claim 21, wherein said computer code is further configured to cause said processor to:

identify another alternate physical path by selecting another upstream node of said first subset of nodes as said first node, if at least one of said each of said second subset of nodes does not have said sufficient resources necessary to support said virtual path, wherein said upstream node is not said one of said first subset of nodes nearest said failure.

23. The network element of claim 15, wherein said computer code is further configured to cause said processor to:

restore said virtual path using said alternate physical path.

24. The network element of claim 15, wherein said network element is one of said nodes.

25. A network element configured to restore a virtual path, said network element comprising:

a processor;

a network interface coupled to said processor and an optical network, wherein said virtual path is over a physical path in said optical network and said optical network comprises a plurality of nodes;

computer readable medium coupled to said processor; and computer code, encoded in said computer readable medium, configured to cause said processor to:

identify an alternate physical path, wherein said physical path comprises a first subset of nodes of said nodes, and said alternate physical path comprises a second subset of nodes of said nodes and is between a first node and a second node of said first subset of nodes;

determine whether said alternate physical path is able to support said virtual path by determining whether each node of said second subset of nodes has sufficient resources necessary to support said virtual path;

detect a failure in said virtual path by receiving a failure message, wherein said first node receives said failure message;

change a state of said virtual path to restoring;

identify an adjacent node with required bandwidth for said virtual path;

forward a resource request packet to said adjacent node with required bandwidth for said virtual path; and wait for a resource response packet for a predetermined time interval.

26. The network element of claim 25, wherein said computer code is further configured to cause said processor to:

if said resource response packet is received with at least one error, wait until responses to all resource request packets are received; and if said resource response packet is received with no errors, determine if a list of allocated ports in said resource response packet is valid.

27. The network element of claim 26, wherein said computer code is further configured to cause said processor to:

if said list of allocated port is valid, provision said virtual path on said allocated ports; and if said list of allocated ports is invalid, generate a network alarm.

28. The network element of claim 25, wherein said physical path between said first and said second node comprises a plurality of intermediate nodes and a one of said intermediate nodes receives said resource request packet, and said computer code is further configured to cause said processor to:

cause said one of said intermediate nodes to allocate a resource to said virtual path.

29. The network element of claim 28, wherein said computer code is further configured to cause said processor to:

if said second resource response packet is not received within a predetermined time interval, release said resource allocated to said virtual path, and forward a negative acknowledgment to said first node.

30. The network element of claim 25, wherein said second node receives said resource request packet, and said computer code is further configured to cause said processor to:

determine if a resource is available for said virtual path.

31. The network element of claim 30, wherein said computer code is further configured to cause said processor to:
if said resource is available for said virtual path, allocate said resource to said virtual path.

32. A computer readable medium encoded with a computer program executable by a computer, the computer program for restoring a virtual path comprising:
a first set of instructions, executable on a computer system, configured to:
detect a failure in said virtual path by receiving a failure message,
acknowledge said failure message,
release a resource of said virtual path,
change a state of a portion of said virtual path to down, and
identify a class of service, among a plurality of classes of service, of said virtual path, and to identify an alternate physical path, wherein
said virtual path is over a physical path in an optical network, said optical network comprising a plurality of nodes,
said physical path comprises a first subset of nodes of said nodes, and
said alternate physical path comprises a second subset of nodes of said nodes and is between a first node and a second node of said first subset of nodes, wherein said second node receives said failure message; and
a second set of instructions, executable on said computer system, configured to determine whether said alternate physical path is able to support said virtual path by determining whether each node of said second subset of nodes has sufficient resources necessary to support said class of service of said virtual path.

33. The computer readable medium of claim 32, the computer program further comprising:
a third set of instructions, executable on said computer system, configured to restore said virtual path using said alternate physical path, if said each of said second subset of nodes has said sufficient resources necessary to support said virtual path.

34. The computer readable medium of claim 32, the computer program further comprising:
a third set of instructions, executable on said computer system, configured to identify another alternate physical path, if at least one of said each of said second subset of nodes does not have said sufficient resources necessary to support said virtual path, wherein
said another alternate physical path comprises a third subset of nodes of said nodes, and
said third subset of nodes differs from said second subset of nodes.

35. The computer readable medium of claim 34, the computer program further comprising:
a fourth set of instructions, executable on said computer system, configured to restore said virtual path using said alternate physical path, if said each of said second subset of nodes has said sufficient resources necessary to support said virtual path.

36. The computer readable medium of claim 32, wherein said physical path between said first and said second node comprises a plurality of intermediate nodes and a one of said intermediate nodes receives said failure message, the computer program further comprising instructions executable on said computer system and configured to:
forward said failure message to adjacent nodes comprising said virtual path;
initiate a timer for receiving a response to said forwarded failure message; and
if said timer expires before said response to said forwarded failure message is received,
release resources of said virtual path, and
if said response to said forwarded failure message is received before said timer expires,
stop said timer, and
release resources of said virtual path.

37. The computer readable medium of claim 32, wherein said first node receives said failure message, the computer program further comprising instructions executable on said computer system and configured to:
change a state of said virtual path to restoring;
identify an adjacent node with required bandwidth for said virtual path;
forward a resource request packet to said adjacent node with required bandwidth for said virtual path; and
wait for a resource response packet for a predetermined time interval.

38. The computer readable medium of claim 37, the computer program further comprising instructions executable on said computer system and configured to:
if said resource response packet is received with at least one error, wait until responses to all resource request packets are received; and
if said resource response packet is received with no errors, determine if a list of allocated ports in said resource response packet is valid.

39. The computer readable medium of claim 37, wherein said physical path between said first and said second node comprises a plurality of intermediate nodes and a one of said intermediate nodes receives said resource request packet, the computer program further comprising instructions executable on said computer system and configured to:
cause said one of said intermediate nodes to allocate a resource to said virtual path.

40. The computer readable medium of claim 39, wherein said physical path between said first and said second node comprises a plurality of intermediate nodes and a one of said intermediate nodes receives said resource request packet, the computer program further comprising instructions executable on said computer system and configured to:
if said second resource response packet is not received within a predetermined time interval,
release said resource allocated to said virtual path, and
forward a negative acknowledgment to said first node.

41. The computer readable medium of claim 37, wherein said second node receives said resource request packet, the computer program further comprising instructions executable on said computer system and configured to:
determine if a resource is available for said virtual path.

42. The computer readable medium of claim 41, wherein said second node receives said resource request packet, the computer program further comprising instructions executable on said computer system and configured to:
if said resource is available for said virtual path, allocate said resource to said virtual path.

43. The computer readable medium of claim 32, wherein said first node receives said failure message, the computer program further comprising instructions executable on said computer system and configured to:
configured to select an upstream node of said first subset of nodes as said first node, wherein said upstream node is a one of said first subset of nodes nearest said failure.

44. The computer readable medium of claim 43, the computer program further comprising:
  instructions executable on said computer system and configured to configured to identify another alternate physical path by selecting another upstream node of said first subset of nodes as said first node, if at least one of said each of said second subset of nodes does not have said sufficient resources necessary to support said virtual path, wherein
    said upstream node is not said one of said first subset of nodes nearest said failure.

45. An apparatus configured to restore a virtual path comprising:
  means for detecting a failure in said virtual path by receiving a failure message;
  means for acknowledging said failure message;
  means for releasing a resource of said virtual path;
  means for changing a state of a portion of said virtual path to down;
  means for identifying a class of service, among a plurality of classes of service, of said virtual path;
  means for identifying an alternate physical path, wherein
    said virtual path is over a physical path in an optical network, said optical network comprising a plurality of nodes,
    said physical path comprises a first subset of nodes of said nodes, and
    said alternate physical path comprises a second subset of nodes of said nodes and is between a first node and a second node of said first subset of nodes, wherein said second node receives said failure message; and
  means for determining whether said alternate physical path is able to support said virtual path by determining whether each node of said second subset of nodes has sufficient resources necessary to support said class of service of said virtual path.

46. The apparatus of claim 45, further comprising:
  means for restoring said virtual path using said alternate physical path, if said each of said second subset of nodes has said sufficient resources necessary to support said virtual path.

47. The apparatus of claim 45, further comprising:
  means for identifying another alternate physical path, if at least one of said each of said second subset of nodes does not have said sufficient resources necessary to support said virtual path, wherein
    said another alternate physical path comprises a third subset of nodes of said nodes, and
    said third subset of nodes differs from said second subset of nodes.

48. The apparatus of claim 47, further comprising:
  means for restoring said virtual path using said alternate physical path, if said each of said second subset of nodes has said sufficient resources necessary to support said virtual path.

49. The apparatus of claim 45, wherein said physical path between said first and said second node comprises a plurality of intermediate nodes and a one of said intermediate nodes receives said failure message, and the method further comprises:
  means for forwarding said failure message to adjacent nodes comprising said virtual path;
  means for initiating a timer for receiving a response to said forwarded failure message; and
  means for if said timer expires before said response to said forwarded failure message is received,
    releasing resources of said virtual path, and
  means for if said response to said forwarded failure message is received before said timer expires,
    stopping said timer, and
    releasing resources of said virtual path.

50. The apparatus of claim 45, wherein said first node receives said failure message, and said method further comprises:
  means for changing a state of said virtual path to restoring;
  means for identifying an adjacent node with required bandwidth for said virtual path;
  means for forwarding a resource request packet to said adjacent node with required bandwidth for said virtual path; and
  means for waiting for a resource response packet for a predetermined time interval.

51. The apparatus of claim 50, further comprising:
  means for waiting until responses to all resource request packets are received, if said resource response packet is received with at least one error; and
  means for determining if a list of allocated ports in said resource response packet is valid, if said resource response packet is received with no errors.

52. The apparatus of claim 51, further comprising:
  means for provisioning said virtual path on said allocated ports, if said list of allocated port is valid; and
  means for generating a network alarm, if said list of allocated ports is invalid.

53. The apparatus of claim 50, wherein said physical path between said first and said second node comprises a plurality of intermediate nodes and a one of said intermediate nodes receives said resource request packet, and the method further comprises:
  means for causing said one of said intermediate nodes to allocate a resource to said virtual path.

54. The apparatus of claim 53, further comprising:
  means for releasing said resource allocated to said virtual path, if said second resource response packet is not received within a predetermined time interval; and
  means for forwarding a negative acknowledgment to said first node, if said second resource response packet is not received within a predetermined time interval.

55. The apparatus of claim 50, wherein said second node receives said resource request packet, and the method further comprises:
  means for determining if a resource is available for said virtual path.

56. The apparatus of claim 55, further comprising:
  means for allocating said resource to said virtual path, if said resource is available for said virtual path.

57. The apparatus of claim 45, further comprising:
  means for selecting an upstream node of said first subset of nodes as said first node, wherein said upstream node is a one of said first subset of nodes nearest said failure.

58. The apparatus of claim 57, further comprising:
  means for identifying another alternate physical path by selecting another upstream node of said first subset of nodes as said first node, if at least one of said each of said second subset of nodes does not have said sufficient resources necessary to support said virtual path, wherein
    said upstream node is not said one of said first subset of nodes nearest said failure.

* * * * *